United States Patent
Wu

(10) Patent No.: US 9,344,260 B2
(45) Date of Patent: May 17, 2016

(54) MULTI-SUBFRAME SCHEDULING MECHANISM FOR BASE STATION AND USER EQUIPMENT

(71) Applicant: HTC Corporation, Taoyuan County (TW)

(72) Inventor: Chih-Yao Wu, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 127 days.

(21) Appl. No.: 14/243,895

(22) Filed: Apr. 3, 2014

(65) Prior Publication Data

US 2014/0301299 A1    Oct. 9, 2014

Related U.S. Application Data

(60) Provisional application No. 61/807,778, filed on Apr. 3, 2013.

(51) Int. Cl.
*H04L 1/00* (2006.01)
*H04L 5/00* (2006.01)
*H04W 72/12* (2009.01)

(52) U.S. Cl.
CPC ............ *H04L 5/0091* (2013.01); *H04L 5/0053* (2013.01); *H04W 72/1278* (2013.01)

(58) Field of Classification Search
CPC ..... H04L 5/001; H04L 5/0053; H04L 5/0037; H04J 11/003; H04W 72/04; H04W 72/05; H04W 72/06
USPC ........................... 370/280, 329, 330, 331, 338
See application file for complete search history.

(56) References Cited

U.S. PATENT DOCUMENTS

2014/0153452 A1*    6/2014    Son .................... H04L 5/001
                                                              370/280

OTHER PUBLICATIONS

3rd Generation Partnership Project (3GPP), "LET; Evolved Universal Terrestrial Radio Access (E-UTRA); Medium Access Control (MAC) protocol specification (3GPP TS 36.321 version 11.2.0 Release 11)," ETSI Technical Specification 136 321 V11.2.0, Apr. 2013, pp. 1-58.

\* cited by examiner

*Primary Examiner* — Dady Chery
(74) *Attorney, Agent, or Firm* — Jianq Chyun IP Office

(57) ABSTRACT

The present disclosure proposes a base station and a user equipment which utilize a multi-subframe scheduling mechanism. The multi-subframe scheduling mechanism includes at least but not limited to the base station transmitting via a transmitter a first subframe which includes a first control channel. Upon receiving the first subframe via a receiver, the UE would decode a first control information from the first control channel. The UE would decode from the first control information a first transmission resource located in the first subframe and then determine whether the first control information indicates a second transmission resource located in a second subframe based on a bit from a bit sequence, wherein the bit corresponds to the first subframe. The UE would receive via the receiver the second transmission resource located in the second subframe if the bit of the bit sequence is in a first state.

16 Claims, 6 Drawing Sheets

MULTI-SUBFRAME SCHEDULING MECHANISM FOR BASE STATION AND USER EQUIPMENT

CROSS REFERENCE TO RELATED APPLICATION

This application claims the priority benefit of U.S.A. provisional application Ser. No. 61/807,778, filed on Apr. 3, 2013. The entirety of the above-mentioned patent application is hereby incorporated by reference herein and made a part of specification.

TECHNICAL FIELD

The present disclosure is directed to a base station and a user equipment which utilize a multi-subframe scheduling mechanism.

BACKGROUND

Deploying a small cell base station (BS) such as a Microcell BS, a Picocell BS, a Femtocell BS, and so forth in a hotspot zone has drawn a lot of interests for the next generation of wireless communication systems and standards such as the Long Term Evolution advanced standard (LTE-advanced or LTE-A). A user equipment (UE) served by a small cell BS is expected to operate with a lower path loss than a UE served by a Macrocell BS and therefore would enjoy a better channel gain. Additionally, since a small cell has smaller cell coverage relative to a typical base station such as a Macrocell BS, a low mobility UE might operate better under a small cell while a high mobility UE might be more refrained from operating under a small cell because of the possibility of frequent handovers and cell-reselections. As a result, the UEs which may benefit the most in small cell deployments are UEs having low device mobility.

One of the problems of UEs served by small cell base stations could be related to interferences among small cell base stations. Without adequate power controls and meticulous resource planning among small base stations, mutual interferences might occur among the small cell base stations. Another one of the problems could be related to excessive signaling overheads which are exchanged between a BS and a UE.

To expound on the point of signaling overheads, refer to FIG. 1 that illustrates a signaling involved in a resource allocation process in order for data to be exchanged between a BS and UE. Typically the downlink control information (DCI) would be used to carry information including the resource allocations, transmission setting (e.g. MIMO layer number, MIMO precoding matrix) and the modulation and coding scheme intended for one or more UE devices. The DCI info information would be encoded in a control channel such as the physical downlink control channel (PDCCH) under various formats which would carry different information such as uplink resource or downlink resource, power control, and so forth.

Considering the case of a downlink transmission from an eNB 101 to a UE 102, the downlink would include at least one subframez 111 to be delivered from the eNB 101 from the UE 102. A subframe such as the subframe 111 would typically include a control channel such as a PDCCH 121 and a data channel such as a downlink control shared channel (PDSCH) 122. Upon the reception of the subframe 111, the UE 121 would blindly decode the PDCCH 122 to obtain control information including the DCI in order to locate payloads intended for the UE 102. Upon a successful descramble of the DCI using a Radio Network Temporary Identifier (RNTI) that belongs to the UE, the UE would be able to locate specific resource blocks in the PDSCH 122 containing payloads for the UE.

However, currently in a communication standard such as the LTE-advanced standard, the DCI message in a PDCCH 121 would only provide scheduling information for the PDSCH 122 in the same subframe 111. There is currently no established mechanism to schedule multiple subframes per DCI message. Since a UE served by a small cell base station would typically experience a relatively stable channel condition in comparison to a UE served by a Macrocell BS, using a DCI message to allocate resources for each individual subframe might be unnecessary in such circumstance and thus might cause signaling overheads to be wasted.

Specific details related to a UE receiving a PDSCH could be located in a reference such as "*Physical Layer Procedures*", 3*GPP TS* 36.213, *V*11.2.0, 2013-03.

Therefore, in view of the aforementioned interference problem and the inefficient use of signaling overheads under small cell operations, there could be a need for a base station and a UE which operate with a multi-subframe scheduling mechanism.

SUMMARY OF THE DISCLOSURE

Accordingly, the present disclosure is directed to a user equipment and a base station which utilizes a disclosed multi-subframe scheduling mechanism.

In one of the exemplary embodiments, the present disclosure is directed to a user equipment which includes at least but not limited to a transmitter and a receiver configured for receiving via the receiver a first subframe comprising a first control channel, decoding a first control information from the first control channel, receiving a first transmission resource located in the first subframe according to the first control information, determining whether the first control information indicates a second transmission resource located in a second subframe based on a bit from a bit sequence, wherein the bit corresponds to the first subframe, and receiving via the receiver the second transmission resource located in the second subframe according to the first control information if the bit of the bit sequence is in a first state.

In one of the exemplary embodiment, the present disclosure is directed to a base station which includes at least but not limited to a transmitter and a receiver configured for allocating a first transmission resource in a first subframe and a second transmission resource in a second subframe, encoding in a first control channel of the first subframe a first control information which indicates the first transmission resource and the second transmission resource, and transmitting via the transmitter the first subframe which corresponds to a bit of a transmitted bit sequence from the base station, wherein the bit has been set to a first state which indicates that the first control information indicates at least the first transmission resource allocated for the first subframe and the second transmission resource allocated for the second subframe.

In order to make the aforementioned features and advantages of the present disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
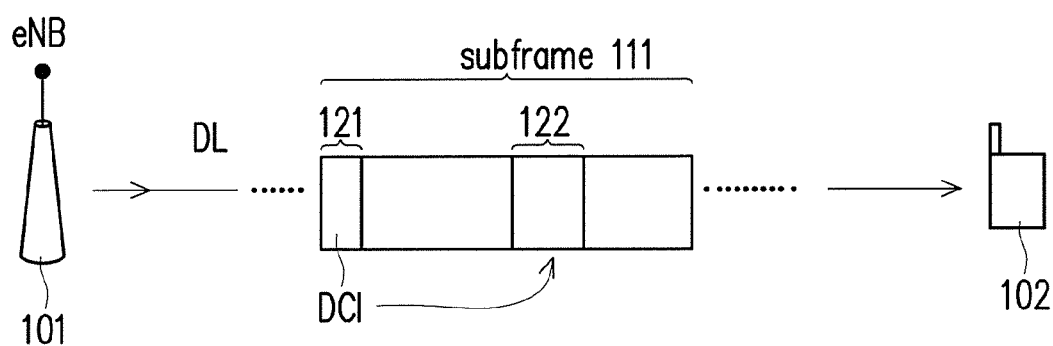
FIG. 1 illustrates a known procedure for a base station to transmit a PDSCH to a user equipment.

Reference will now be made in detail to the present exemplary embodiments of the disclosure, examples of which are illustrated in the accompanying drawings. Wherever possible, the same reference numbers are used in the drawings and the description to refer to the same or like parts.

In previous 3Gpp releases, one DCI message in a PDCCH would only provide scheduling information for the PDSCH in the same subframe. In other words, a DCI message decoded from a PDSCH located in a subframe currently does not provide the capability of multi-subframe scheduling. Considering the case of dense deployments of small cell base stations, using multi-subframe scheduling by which one DCI message in a PDCCH may provide scheduling information for a plurality of PDSCH's of consecutive subframes may reduce control signaling overhead and therefore achieve better resource efficiency. On the other hand, to achieve better interference coordination, small cell base stations with dynamic power on/off switch or power adjustment could be used. Also, information could be exchanged among small cell base stations, and the information to be exchanged may include subframes which suffer the most from severe interferences of other cells. In this way, a cell may turn off data transmissions in that particular subframe according to the information exchanged among base stations. This would be similar to the almost blank subframe (ABS) operation in 3Gpp release 10 and release 11.

However, the aforementioned solution may have drawbacks if every subframe is allowed to be used as the initial subframe of multi-subframe scheduling. First, if every subframe is allowed to be used as the scheduling subframe or a first subframe of multi-subframe scheduling, dynamic power on/off switch will be very difficult to implement. One of the reasons could be that when multi-subframe scheduling is activated, small cell base stations may have difficulties turning off data transmissions in these consecutive subframes. The flexibility of interference coordination might be severely affected if multi-subframe scheduling is possible in every subframe. Therefore, a dilemma exists between scheduling flexibility and interference coordination. As a result, if mobile devices can only be configured for either multi-subframe scheduling or normal signal sub-subframe scheduling, mobile devices configured for only multi-subframe scheduling would not be able to be scheduled for a high quantity of subframes in advance. This problem could be solved by adding one more flag bit in a DCI message to indicate whether the single-subframe scheduling scheme or the multi-subframe scheduling scheme is used for this DCI message. However, this solution is also not satisfaction as additional overheads in DCI messages would be required and may result in other problems.

The aforementioned drawbacks is to be accomplished by introducing a bit sequence named multi-subframe scheduling activated pattern which conveys information about which subframe is valid for multi-subframe DCI messages while other subframes are not. A binary value of the above mentioned bit sequence would indicate that a decoded DCI message detected in a subframe would be used for multi-subframe scheduling and that this subframe is an activated subframe. On the other hand, the other binary state would mean that the DCI message detected in this subframe would be used for single-subframe scheduling. The sequence may have fixed periodicity or variable periodicity which can also be adjusted. For example, if the pattern equals to "1001000001" and the length of multi-subframe scheduling is 2 subframes, that would mean that the scheduling information in a DCI messages blindly decoded in subframe 0, 3, 9 would also be used in subframes 1, 4, 10 respectively. (The mentioning of "subframe 10" would imply that the multi-subframe scheduling could extend beyond a radio frame as a scheduling of, for example, 50 subframes or more could be conceivable.)

This sequence could be transmitted from a base station to a mobile device via a control signaling message. For example, this sequence could be transmitted via a radio resource control (RRC) signaling message. A base station, both small cell and Macrocell, could coordinate its data transmission between multi-subframe scheduling and single-subframe scheduling according to this sequence. Multi-subframe scheduling and single-subframe scheduling would be applicable to an activated subframe and might not be applicable to a dormant subframe. A base station may also transmit the length of multi-subframe scheduling to mobile devices by RRC signaling or other channels. Otherwise, the length of multi-subframe scheduling can also be predefined according to an alternative embodiment.

Therefore, a control message such as a RRC signaling message could be used to transmit the aforementioned multi-subframe scheduling information which may contain at least one or more of these following components including (1) a multi-subframe scheduling activated pattern in the form of a bit sequence, (2) the length of the multi-subframe scheduling activated pattern, (3) the length of a multi-subframe scheduling per subframe, (4) the periodicity of the multi-subframe scheduling activated pattern.

After a UE blindly decodes the DCI messages in each subframe, the UE may use the scheduling information in DCI messages to receive PDSCH in the same subframe where DCI messages are detected. After that, according to the multi-subframe scheduling activated pattern, the mobile devices device would decide whether the scheduling information in the DCI messages can be applied to the following several consecutive subframes or not. In other words, in the activated subframes, a UE may apply the scheduling information obtained from the blindly decoded DCI message for the same subframe where a DCI message is detected as well as the following several consecutive subframes if applicable.

The mapping between the multi-subframe scheduling activated pattern and the corresponding subframes can be decided by, for example, the system frame number (SFN). For example, if the multi-subframe scheduling activated pattern has 20 bits, the first bit of the multi-subframe scheduling activated pattern can be mapped to the first subframe of the radio frame with SFN equals to multiples of 2. The bits after the first bit are mapped to the subframes after the first subframe of the radio frame with SFN equals to multiples of 2 sequentially.

The length of how many consecutive subframes the same scheduling information can be applicable for is configured by a control signaling such as the RRC signaling. Otherwise, a UE may apply the scheduling information obtained from the blinded decoded DCI messages only for the same subframe from which a DCI message is detected. A base station may apply the same multi-subframe scheduling activated pattern for all UEs attached to the base station, or the UE may otherwise apply the multi-subframe scheduling activated pattern in an individual basis or in a group by group basis. In general, the length of a multi-subframe scheduling per subframe could be indicated by a parameter N, so that the DCI message would indicate transmission resources in N−1 consecutive subframes. The number N could be any integer equals to or greater than 1.

The multi-subframe scheduling activated pattern may also be exchanged among base stations. For example, multi-subframe scheduling activated pattern could be exchanged via a X2 interface or by other wireless or wired backhaul channels. When having these sequences, each base station gains the knowledge about which subframes and their following several consecutive subframes could be possible to be scheduled for data transmission by multi-subframe scheduling by other base stations so that each base station may adjust its own required on/off pattern to generate an adjusted on/off pattern which may also be exchanged among base stations. The adjusted on/off pattern transmitted to other base stations could be accompanied with a request to ask another base station to mute or to turn off certain subframes. By incorporating information such as the multi-subframe scheduling activated pattern, interference mitigation by a base station could be performed more efficiently.

Therefore, by using the multi-subframe scheduling activated pattern, several issues can be handled efficiently. First, the seamless switch between multi-subframe scheduling and single-subframe scheduling can be achieved. Mobile devices determine whether the scheduling information in the blindly decoded DCI messages in each subframe can be applied to the following several consecutive subframes or not according to the multi-subframe scheduling activated pattern. As a result, no additional flag bits would be required in a DCI message to determine whether a multi-subframe scheduling is used or not. Second, the multi-subframe scheduling using a DCI message could be made to be more focused in the activated subframes. Since DCI messages for different mobile devices are multiplexed in PDCCH, more focused DCI messages leads to a better multiplexing efficiency. Third, by using a DCI message in a subframe to schedule multiple subframes, control signaling overhead is reduced. Lastly, exchanges of multi-subframe scheduling activated patterns could be shared among base stations to facilitate interference coordination such as by turning on or off certain subframes by small cell base stations.

Figure 2:
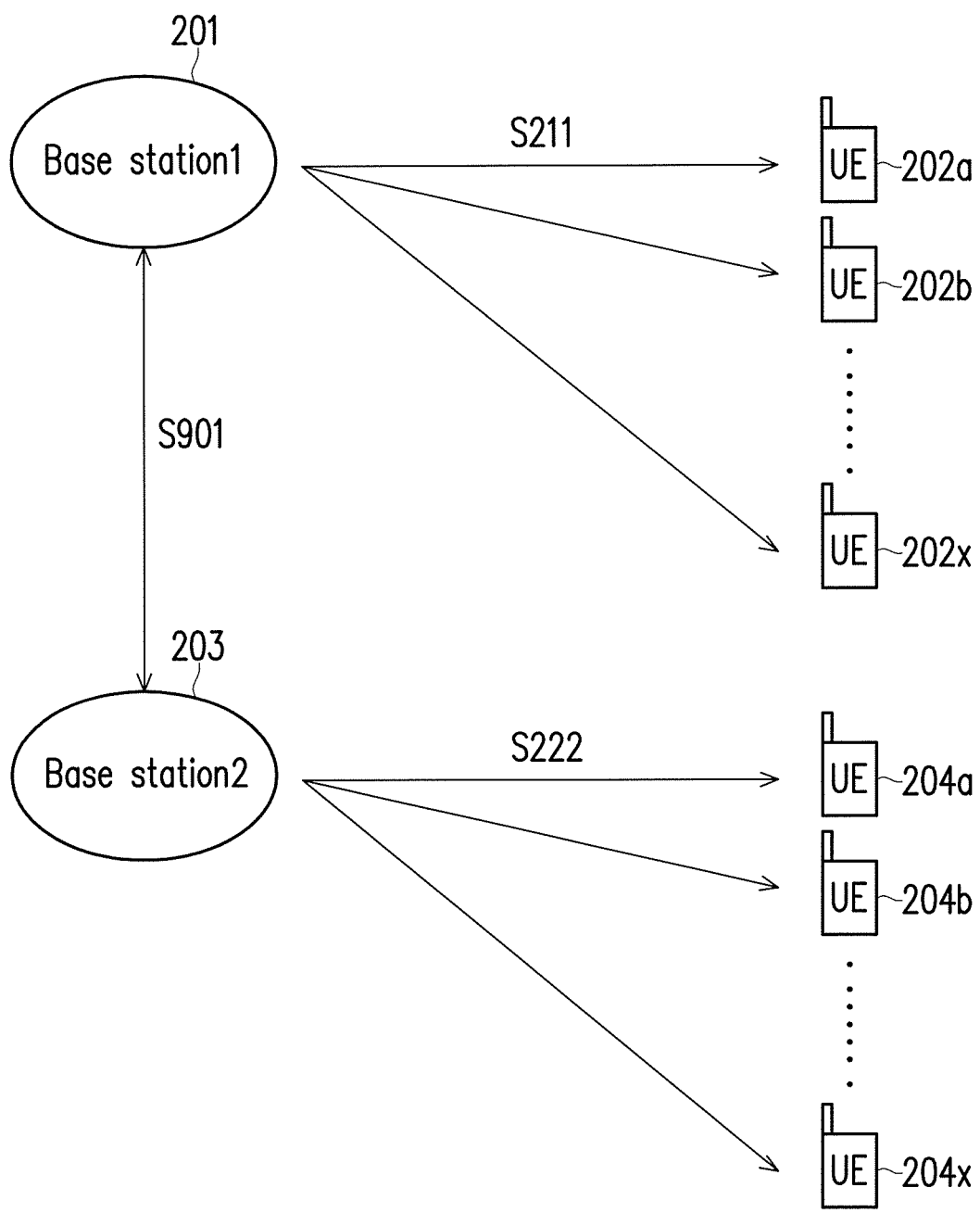
FIG. 2 illustrates transmitting multi-subframe activated pattern among base stations and UEs in accordance with an exemplary embodiment of the present disclosure.

An exemplary embodiment of the aforementioned principle is provided by FIG. 2~FIG. 6 as well as the corresponding written description of these figures. FIG. 2 illustrates transmitting multi-subframe activated pattern among base stations and UEs in accordance with an exemplary embodiment of the present disclosure. In step S211, the base station 201 would transmit a control signaling message to one or more UEs (202a, 202b, . . . 202x) served under the base station 201, and the control signaling message may include a multi-subframe scheduling activated pattern as well as parameters associated with the multi-subframe scheduling activated pattern. Each one of the UEs (202a, 202b, . . . 202x) could stand for an individual UE or a group of UEs such that the same control signaling message could be transmitted to an individual UE, to a group of UEs, or to all UEs served by the same base station 201. In step S222, the base station 202 would transmit a control signaling message to one or more UEs (202a, 202b, . . . 202x) served under the base station 203. As previously mentioned, the multi-subframe scheduling activated pattern and associated parameters would determine whether a DCI in a PDCCH of a subframe schedules transmission resources for multiple consecutive subframes.

In step S901, the base station 201 may share the multi-subframe scheduling activated pattern and associated parameters associated to the base station 203 or the base station 203 may share the multi-subframe scheduling activated pattern and associated parameters to the base station 201 or both. The sharing of the multi-subframe scheduling activated pattern and associated parameters could be accomplished through an inter-base station interface. For example if the base station 201 is a macro cell base station, the base station 201 may share the multi-subframe scheduling activated pattern with the base station 202 through a X2 interface or through other wireless or wired channels. As the base station 202 possesses the knowledge of the multi-subframe scheduling activated pattern and associated parameters of the base station 201, the base station 202 would have better knowledge of which subframes and their following consecutive subframes might be scheduled for data transmission such that the base station 201 may adjust its own on/off subframe pattern or to request the base station 202 to adjust the on/off subframe pattern of the base station 202 in order to more efficiently achieve interference coordination. It should be noted that the base stations 201 and base station 202 could both be a Macro cell BS, could both be a small cell BS, or could be a Macro cell BS and a small cell BS respectively.

Figure 3:
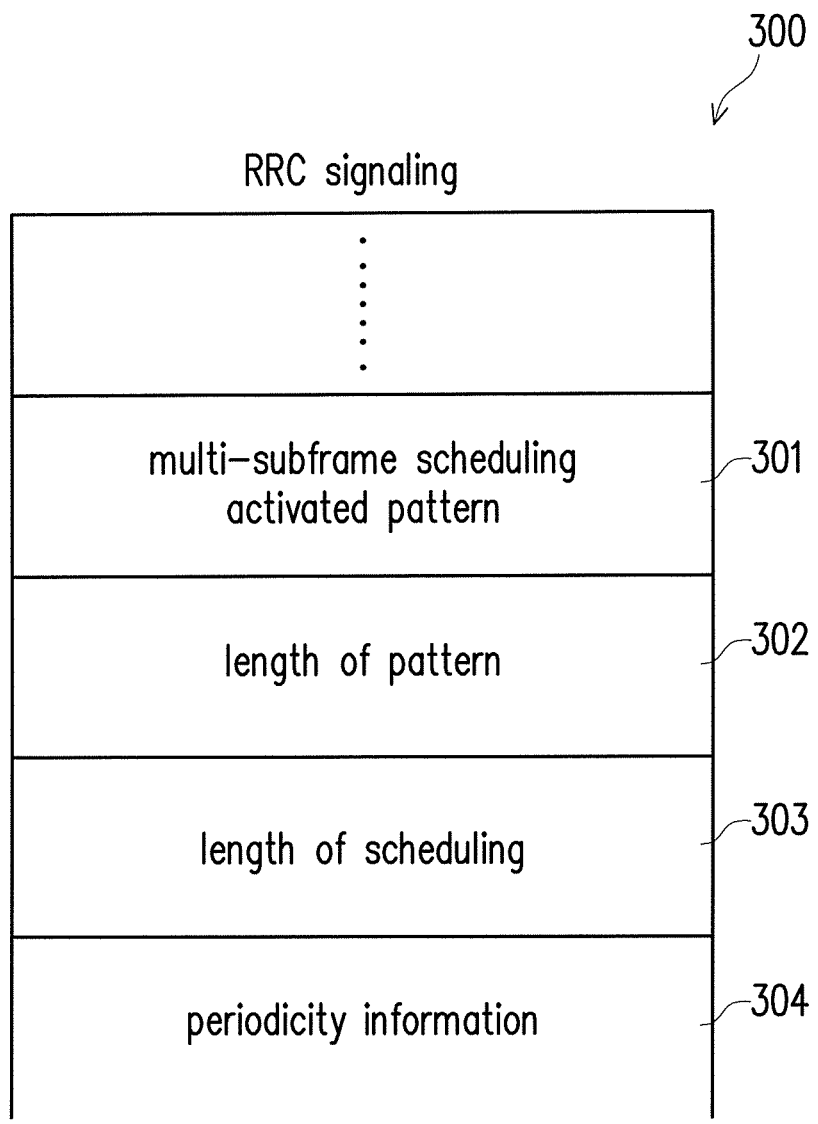
FIG. 3 illustrates an example of a multi-subframe scheduling pattern and associated controlling signaling included in a control message in accordance with an exemplary embodiment of the present disclosure.

The controlling signaling message transmitted in step S221 and step S222 could be for example a RRC message. In other words, the multi-subframe scheduling activated pattern and associated parameters could be piggybacked in a RRC message as shown in FIG. 3. The content of the RRC message may include a multi-subframe scheduling pattern 301, a length of the multi-subframe scheduling pattern 302, a length of scheduling 303, and a periodicity information 304. The multi-subframe scheduling activated pattern 301 would be a sequence of bits. The length of the multi-subframe scheduling activated pattern 302 is optional in the sense that the length could be predefined, but otherwise the length could be embedded in the RRC message to indicate the length of the sequence of bits. The length of scheduling 303 is a parameter which indicates the numbers of consecutive subframes to be scheduled by the same DCI as indicated by a bit from the sequence of bits. The periodicity information may include information such as whether the multi-subframe scheduling pattern 301 is periodic or aperiodic. If the multi-subframe scheduling pattern 301 is periodic, the periodicity information may further include information such as the number of times the multi-subframe scheduling pattern repeats itself.

Figure 4:
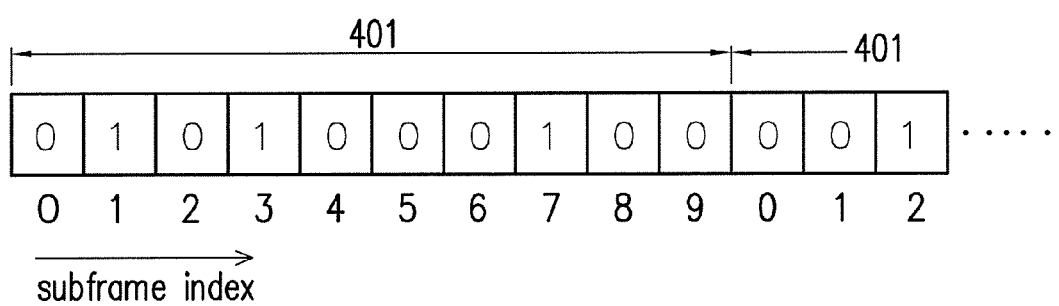
FIG. 4 illustrates parameters related to a multi-subframe scheduling pattern delivered through a control signaling message in accordance with an exemplary embodiment of the present disclosure.

FIG. 4 illustrates parameters related to a multi-subframe scheduling pattern delivered through a control signaling message in accordance with an exemplary embodiment of the present disclosure. Assuming that a bit sequence 0101000100001 is transmitted to a UE, each bit would represent and correspond to the scheduling information of a subframe of a radio frame. For example, the first four bits 0101 would represent a first four subframe indexes of a radio frame 401 respectively, and the first four subframe index of a radio frame are 0, 1, 2, and 3. Since the sequence of bits could be more than 10 bits, this would mean that the multi-subframe scheduling pattern could provide subframe scheduling information longer than a radio frame.

For example, the bit value "0" could represent that a DCI would only schedule a transmission resource located in the same subframe from which the DCI has been decoded. In other words, the DCI would only point to a PDSCH located in the same subframe as the DCI. Since the first bit is "0", and assuming that the first bit zero corresponds to the subframe number zero or the first subframe of a radio frame 401, it would mean that the DCI information decoded from the PDCCH of the subframe zero would only be used to locate the PDSCH in subframe zero alone. However, the bit value "1" would represent that a DCI would contain scheduling information located not only for the same subframe from which the DCI has been decoded but also for subsequent subframes. Therefore, since the second bit is a value "1", it would mean that the DCI information decoded from the PDCCH of the subframe 1 would be used to receive PDSCH not only in subframe 1 but also in at least one consecutive subframe after subframe 1. If assuming that the length of scheduling 303 is two, then the transmission resource information decoded from the DCI of subframe 1 would also be applied in subframe 2. This would mean that the same scheduling information from the DCI of subframe 1 would also be used in subframe 2 to locate payloads of a UE in the same resource blocks as subframe 1.

Also in the same example of FIG. 4, since the fourth bit is a "1" and assuming that the length of scheduling 303 is four, then the scheduling information of the DCI decoded from subframe three, would also be applied for subframes 4, 5, and 6. In other words, the same transmission resource information would be used to locate payloads of a UE in the same resource blocks of subframes 3, 4, 5, and 6. In this way, since a scheduling information obtained from one subframe could also be used in three other subframes, signaling overhead can be reduced.

Also in the example of FIG. 4, the length of the multi-subframe scheduling pattern 302 is thirteen. If the periodicity information 304 indicates that the multi-subframe scheduling pattern is periodic and would repeat once, then a UE which receives the multi-subframe scheduling pattern may assume that the actual bit sequence is twenty six bits and would actually be 01010001000010101000100001 for example.

Figure 5:
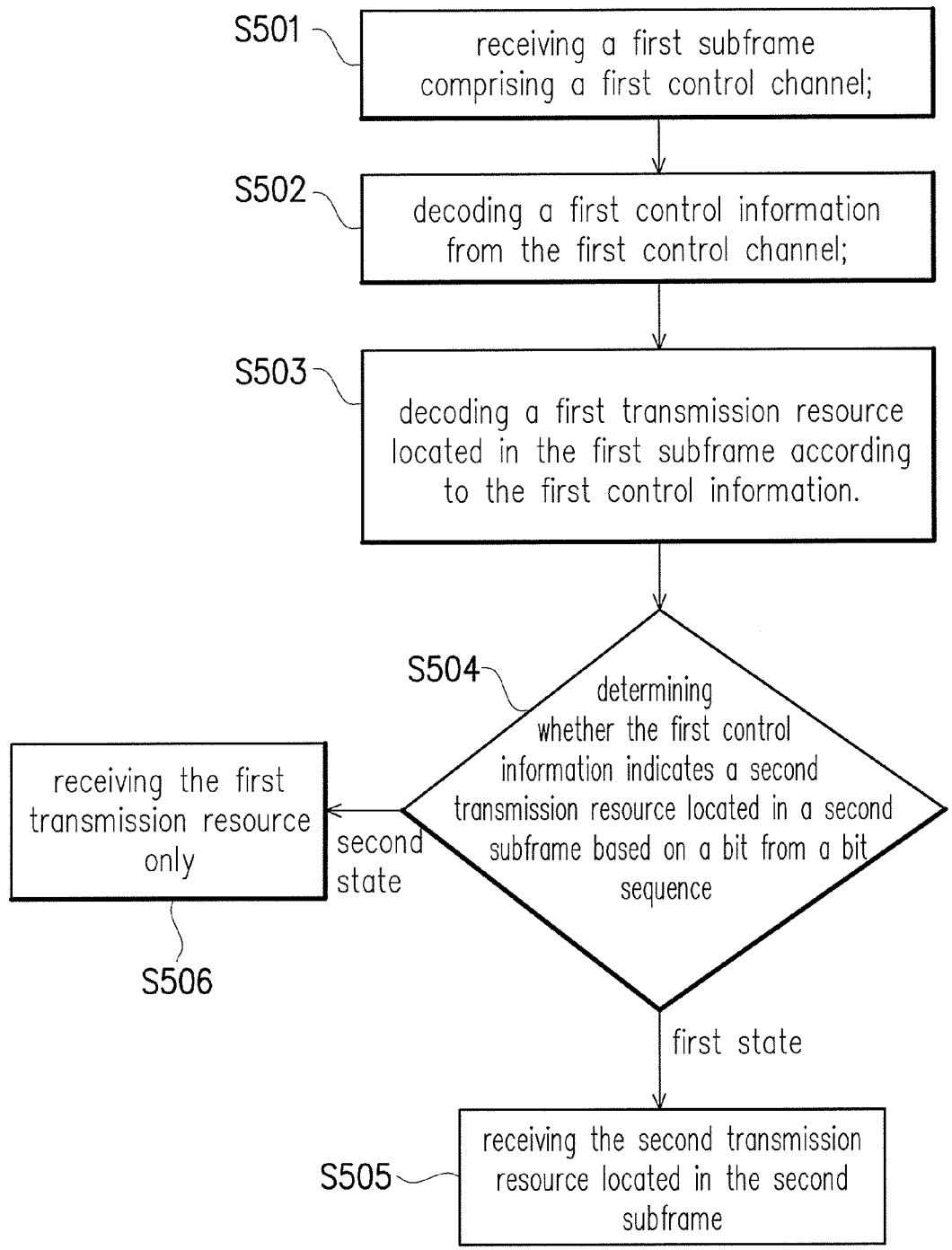
FIG. 5 illustrates an implementation of the multi-subframe scheduling pattern from the perspective of a UE in accordance with an exemplary embodiment of the present disclosure.

FIG. 5 illustrates an implementation of the multi-subframe scheduling pattern from the perspective of a UE in accordance with an exemplary embodiment of the present disclosure. In step S501, the UE would receive at least but not limited to a first subframe which includes a first control channel (e.g. PDCCH). In step S502, the UE would decode a first control information (e.g. DCI) from the first control channel. In step S503, the UE would decode a first transmission resource (e.g. PDSCH) located in the first subframe according to the first control information. In step S504, the UE would determine whether the first control information would indicate not only the first transmission resource located in the first subframe but also a second transmission resource located in a second subframe based on a bit from a bit sequence (e.g. the multi-subframe scheduling activated pattern). If the bit that corresponds to the first subframe shows a first state (e.g. "1"), then in step S505, the UE would also use the same DCI to receive the second transmission resource (PDSCH) located in the second subframe. If the bit that corresponds to the first subframe shows a second state (e.g. "0"), then in step S506, the UE would also use the DCI to receive the first transmission resource located in the first subframe only. The aforementioned bit contained in the bit sequence could be received by the UE via a control signaling message such as a RRC message.

Figure 6:
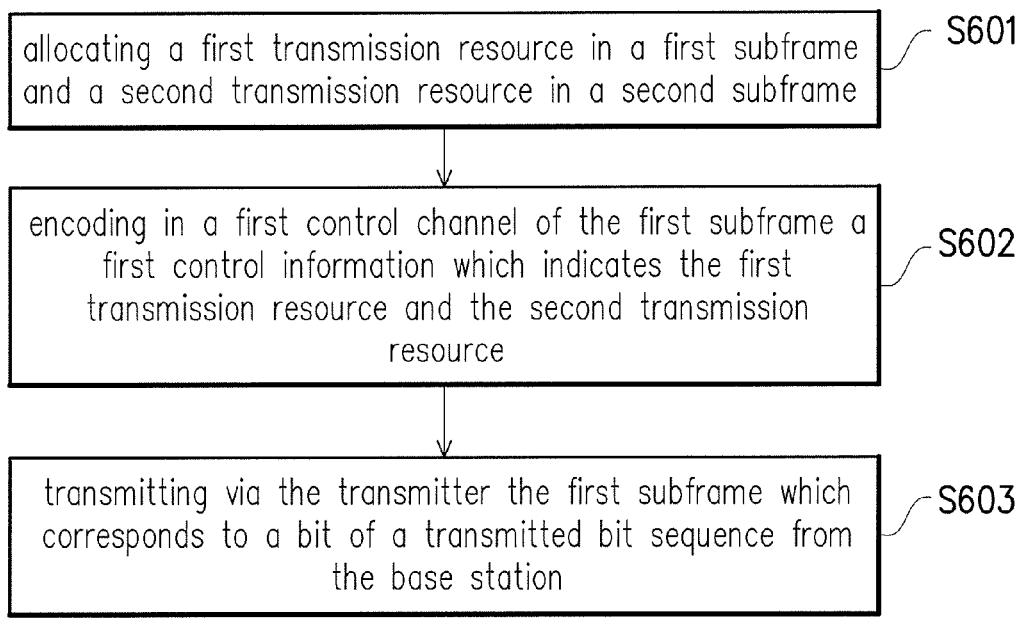
FIG. 6 illustrates an implementation of the multi-subframe scheduling pattern from the perspective of a base station in accordance with an exemplary embodiment of the present disclosure.

FIG. 6 illustrates an implementation of the multi-subframe scheduling pattern from the perspective of a base station in accordance with an exemplary embodiment of the present disclosure. In step S601, the base station would allocate a first transmission resource (e.g. PDSCH) in a first subframe and a second transmission resource in a second subframe. In step S602, the base station would encode in a first control channel (e.g. PDCCH) of the first subframe a first control information (e.g. DCI) which indicates both the first transmission resource in the first subframe and the second transmission resource in the second subframe. In step S603, the base station would transmit the first subframe which corresponds to a bit of a transmitted bit sequence (e.g. multi-subframe scheduling activated pattern) from the base station, wherein the bit has been set to a first state (e.g. "1") which indicates that the first control information indicates at least the first transmission resource allocated for the first subframe and the second transmission resource allocated for the second subframe. If the bit had been set to a second state instead (e.g. "0"), this would mean that the first control information would not be used to receive the second transmission resource allocated for the second subframe, and a hence a conflict would occur. This situation would however be avoided. Also, if the first control information only indicates the first transmission resource in the first subframe only, the bit should be set to the second state. The aforementioned bit contained in the bit sequence could be transmitted from the base station via a control signaling message such as a RRC message.

In view of the aforementioned descriptions, the present disclosure is applicable for a wireless communication system and is able to accomplish multi-subframe scheduling by using an activated pattern which contains information about which subframe is valid for the multi-subframe DCI message while other subframes are not. This sequence would be transmitted from a base station to a mobile device and could be exchanged among base stations. By utilizing the multi-subframe scheduling activated pattern, scheduling flexibility could be enhanced. Also interference coordination, control signaling overhead reduction, and seamless switch between multi-subframe scheduling and signal subframe scheduling could be accomplished.

In this disclosure, although the use of keywords or phrases are consistent with LTE/LTE-A standards, the keywords and phrases as used merely serve as examples to disclose various concepts in accordance with the present disclosure; however, the same concept presented in the disclosure may also be extended to any other systems such as IEEE 802.11, IEEE 802.16, WiMAX, and so like by persons of ordinarily skilled in the art.

A base station in this disclosure may also include base stations such as an advanced base station (ABS), a base transceiver system (BTS), a node B, an evolved node B (eNB), a home eNB, a macro base station, a pico base station, a femto base station, an access point, a home base station, a relay station, a repeater, an intermediate node, an intermediary, and/or satellite-based communication base stations.

From the hardware perspective, a base station may include at least but not limited to a transmitter circuit, a receiver circuit, an analog-to-digital (A/D) converter, a digital-to-analog (D/A) converter, a processing circuit, one or more antenna units, and optionally a storage medium. The transmitter and the receiver transmit downlink signals and receive uplink signals wirelessly. The receiver may include functional elements to perform operations such as low noise amplifying, impedance matching, frequency mixing, down frequency conversion, filtering, amplifying, and so forth. The transmitter may include function elements to perform operations such as amplifying, impedance matching, frequency mixing, up frequency conversion, filtering, power amplifying, and so forth. The analog-to-digital (A/D) or the digital-to-analog (D/A) converter is configured to convert from an analog signal format to a digital signal format during uplink signal processing and from a digital signal format to an analog signal format during downlink signal processing.

The processing circuit is configured to process digital signal and to perform functions, processes or procedures, or method steps of the proposed method in exemplary embodiments of the present disclosure. Also, the processing circuit may optionally be coupled to a memory circuit to store programming codes, device configurations, a codebook, buffered or permanent data, and etc. . . . The functions of the processing circuit may be implemented using programmable units such as a micro-processor, a micro-controller, a DSP chips, FPGA, etc. The functions of the processing circuit may also be implemented with separate electronic devices or ICs, and the processing circuit may also be implemented with either hardware or software.

The term "user equipment" (UE) in this disclosure could represent various embodiments which for example could include but not limited to a mobile station, an advanced mobile station (AMS), a server, a client, a desktop computer, a laptop computer, a network computer, a workstation, a personal digital assistant (PDA), a tablet personal computer (PC), a scanner, a telephone device, a pager, a camera, a television, a hand-held video game device, a musical device, a wireless sensor, and so like. In some applications, a UE may be a fixed computer device operating in a mobile environment, such as a bus, train, an airplane, a boat, a car, and so forth.

From the hardware perspective, a UE may include at least but not limited to a transmitter circuit, a receiver circuit, an analog-to-digital (A/D) converter, a digital-to-analog (D/A) converter, a processing circuit, one or more antenna units, and optionally a memory circuit. The memory circuit may store programming codes, device configurations, buffered or permanent data, codebooks, and etc. . . . The processing circuit may also be implemented with either hardware or software and would be considered to implement the functions, processes or procedures, and method steps of embodiments of the present disclosure. The function of each element of a UE is similar to a control node and therefore detailed descriptions for each element will not be repeated.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of" and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

Moreover, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:

1. A user equipment comprising:
   a transmitter and a receiver configured for transmitting and receiving data respectively; and
   a processor coupled to the transmitter and the receiver and is configured for:
      receiving via the receiver a first subframe comprising a first control channel;
      decoding a first control information from the first control channel;
      receiving via the receiver a control signaling message comprising a bit sequence, wherein the control signaling message further comprises a length of scheduling information N which indicates transmission resources in N−1 consecutive subframes, wherein N is an integer greater than 0;
      receiving a first transmission resource located in the first subframe according to the first control information;
      determining whether the first control information indicates a second transmission resource located in a second subframe based on a bit from the bit sequence, wherein the bit corresponds to the first subframe; and
      receiving via the receiver the second transmission resource located in the second subframe according to the first control information if the bit of the bit sequence is in a first state.

2. The UE of claim 1, wherein the processor is configured for:
   receiving via the receiver the first transmission resource only according to the first control information if the bit of the bit sequence is in a second state.

3. The UE of claim 2, wherein the first subframe and the second subframe are consecutive subframes, and the second subframe corresponds to another bit right after the bit of the bit sequence.

4. The UE of claim 1, wherein the control signaling message further comprises a length of the bit sequence.

5. The UE of claim 4, wherein the length of the bit sequence is predefined.

6. The UE of claim 1, wherein the control signaling message further comprises periodicity information of the bit sequence.

7. The UE of claim 1, wherein the first control information indicates the first transmission resource and the second transmission resource in the same resource block and has the same transmission format of the first subframe and the second subframe respectively.

8. The UE of claim 1, wherein the control signaling message is a radio resource control (RRC) message.

9. A base station comprising:
a transmitter and a receiver configured for transmitting and receiving data respectively; and
a processor coupled to the transmitter and the receiver and is configured for:
allocating a first transmission resource in a first subframe and a second transmission resource in a second subframe;
encoding in a first control channel of the first subframe a first control information which indicates the first transmission resource and the second transmission resource;
transmitting via the transmitter a control signalling message comprising a bit sequence, wherein the control signaling message further comprises a length of scheduling information N which indicates transmission resources in N−1 consecutive subframes, wherein N is an integer greater than 0; and
transmitting via the transmitter the first subframe which corresponds to the bit of a transmitted bit sequence from the base station, wherein the bit has been set to a first state which indicates that the first control information indicates at least the first transmission resource allocated for the first subframe and the second transmission resource allocated for the second subframe.

10. The base station of claim 9, wherein the transmitted bit sequence further comprises another bit which has been set to a second state which indicates that a second control information located in a third subframe indicates a third transmission resource only for the third subframe.

11. The base station of claim 9, wherein the first subframe and the second subframe are consecutive subframes, and the second subframe corresponds to another bit right after the bit of the bit sequence.

12. The base station of claim 9 the control signaling message further comprises a length of the bit sequence.

13. The base station of claim 12 the length of the bit sequence is predefined.

14. The base station of claim 9 the control signaling message further comprises periodicity information of the bit sequence.

15. The base station of claim 9 the first control information indicates the first transmission resource and the second transmission resource in the same resource block and has the same transmission format of the first subframe and the second subframe respectively.

16. The base station of claim 9, wherein the bit sequence is transmitted via the transmitter through an inter-base station interface.

* * * * *